Figure 1:
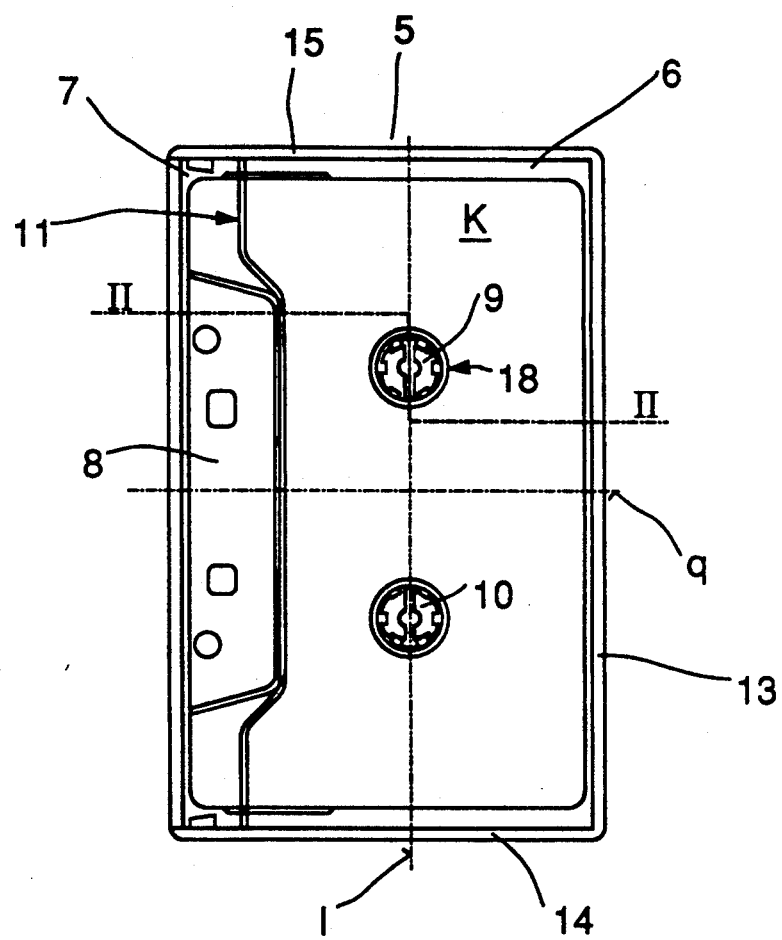

United States Patent [19]
Schoettle et al.

[11] Patent Number: 5,209,351
[45] Date of Patent: May 11, 1993

[54] CONTAINER FOR TAPE CASSETTES

[75] Inventors: Klaus Schoettle, Heidelberg; Joachim Eberhard, Kippenheim; Lothar Gliniorz, Frankenthal; Bozidar Pavelka, Willstaett, all of Fed. Rep. of Germany

[73] Assignee: BASF Magnetics GmbH, Mannheim, Fed. Rep. of Germany

[21] Appl. No.: 822,264

[22] Filed: Jan. 17, 1992

[30] Foreign Application Priority Data

Jan. 19, 1991 [DE] Fed. Rep. of Germany ... 9100607[U]

[51] Int. Cl.$^5$ ............................................ B65D 85/575
[52] U.S. Cl. ...................................... 206/387; 206/493
[58] Field of Search ......................... 206/387, 493, 309

[56] References Cited

U.S. PATENT DOCUMENTS

| | | | |
|---|---|---|---|
| 4,291,801 | 9/1981 | Basili et al. | 206/387 |
| 4,428,482 | 1/1984 | Ogawa et al. | 206/387 |
| 4,593,814 | 6/1986 | Hagiwara et al. | 206/387 |
| 4,614,269 | 9/1986 | Dietze et al. | 206/387 |
| 4,913,287 | 4/1990 | Kagano | 206/387 |
| 5,064,065 | 11/1991 | Takahashi | 206/387 |

FOREIGN PATENT DOCUMENTS

| | | | |
|---|---|---|---|
| 1300864 | 8/1969 | Fed. Rep. of Germany. | |
| 2612773 | 10/1976 | Fed. Rep. of Germany | 206/387 |
| 3149559 | 6/1983 | Fed. Rep. of Germany | 206/387 |
| 3335558 | 4/1985 | Fed. Rep. of Germany | 206/387 |
| 2166417 | 5/1986 | United Kingdom | 206/387 |

Primary Examiner—Jimmy G. Foster
Attorney, Agent, or Firm—Keil & Weinkauf

[57] ABSTRACT

A container for tape cassettes is provided with one or more locking elements which comprise one or more ring segments which are roughly adapted to the drive orifice of the cassette. An advantageous embodiment is formed integrally with a web and, preferably, an ejector peg. Overlaps in the edge contour part of a joint and the height of the peg adapted to the internal dimension of the container provide greater stability to lateral compressive forces and forces acting during fall.

18 Claims, 3 Drawing Sheets

CONTAINER FOR TAPE CASSETTES

The present invention relates to a parallelepiped container for tape cassettes, in particular for compact cassettes, having a bottom part which possesses a bottom wall with one or more locking elements for the one or more tape carriers in the cassette and one or more back walls and/or front walls and side walls of the bottom part, and having a lid part consisting of one or more lid walls.

Containers of this type are known for tape cassettes having one or two tape reels on which a tape-like or strip-like article, most frequently a recording medium, e.g. a magnetic tape, is wound. Such a cassette container is disclosed, for example in German Published Application DAS 1,300,864, for compact cassettes having two coplanar hubs as tape supports. Such cassette containers generally consist of thermoplastics, for example of polystyrene, and, in order to save material, have poor stability, particularly when they are stacked in the empty or filled state. Without special measures, these containers tend to fracture and thus lose their protective function for the magnetic tape cassette which is to be safely stored.

DE-U 88 11 110 discloses a cassette container which has star-shaped locking spindles for the hubs in the cassette. This directly locks the hubs, preventing rotation, but not the cassette housing to prevent relative movement in the container.

It is an object of the present invention to provide a container having an improved protection function for the cassette.

This object is achieved, according to the invention, by a parallelepiped container for tape cassettes, in particular for compact cassettes, having a bottom part comprising a bottom wall with one or more locking elements for the one or more tape carriers, with drive openings, and one or more back walls and/or front walls and side walls of the bottom part, and having a lid part consisting of one or more lid walls, if the locking element contains one or more ring segments whose arc shape roughly corresponds to the circular contour of the drive opening for the tape carrier, for approximate contact between these.

This advantageously ensures that the cassette is locked separately and directly in the container and not only indirectly via the hubs.

The one or more ring segments can advantageously be arranged roughly symmetrically with respect to the longitudinal axis of the cassette so that locking is preferentially achieved in the longitudinal direction, i.e. for falling of the cassette on a narrow side of the container.

It may also be advantageous if the one or more ring segments are roughly symmetrical with respect to a normal to the longitudinal central axis, i.e. prevent the cassette from falling onto a broad side of the container. It is also possible for both arrangements to be combined in one or two locking elements, so that the cassette can be better protected from damage as a result of falling. Webs of relatively great height in the longitudinal direction and/or transverse direction can be combined with the ring segments.

In addition to ring segment and longitudinal or transverse webs, it is also advantageous to provide, on each locking element, a peg whose length advantageously should roughly correspond to the internal dimension of the container, thus substantially increasing the stability of the container to compression.

For a container in which the bottom wall has a cut-out and the lid part has a receiving pocket for the tape cassette and a pocket front wall complementing the cut-out, it is also advantageous, to prevent compression and for protection from dust, if the cut-out of the bottom part and the pocket front wall are provided with edge contour parts which overlap when the container is closed.

In an advantageous embodiment, the locking element is integral with the one or more ring segments, longitudinal webs and/or transverse webs and preferably with the peg.

Embodiments of a container according to the invention are described below with reference to the drawing.

Figure 2:
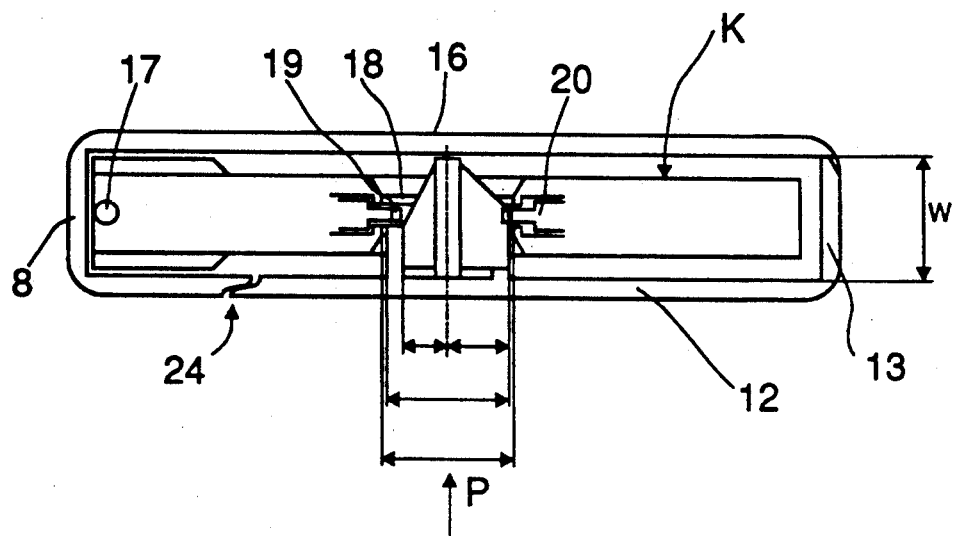
Figure 3:
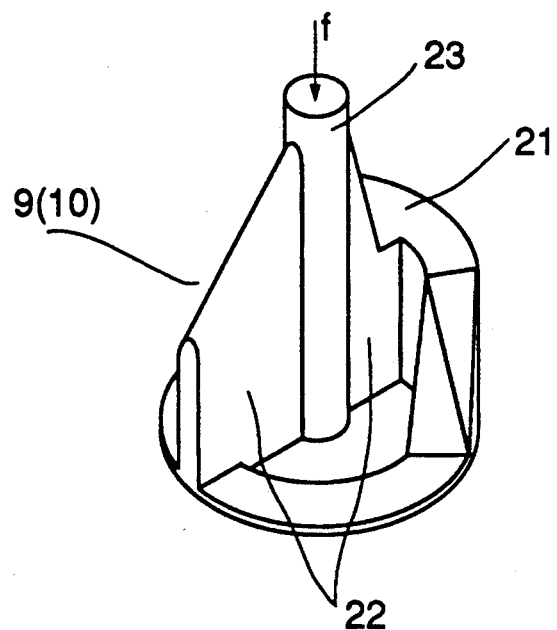

In the drawing,

FIG. 1 shows a transparent container with a compact cassette in the closed state, FIG. 2 shows a partial sectional view of the container and of the middle part of the cassette along line II—II in FIG. 1, FIG. 3 shows a perspective view of an integral locking element and Figures show different arrangements and embodiments of 4a-4e locking elements in container halves with a cassette.

The container 5, viewed from below along arrow p in FIG. 2, consists of bottom part 6 and lid part 7, the lid part 7 having a pocket 8 for the cassette and the bottom part having locking spindles 9 and 10. The bottom part 6 is provided with a cut-out 11 into which the front wall of the pocket 8 fits when container 5 is closed. Container 5 contains a compact cassette K.

The bottom part 6 consists of bottom wall 12, back wall 13 and side walls 14 and 15. The lid part 7 essentially consists of the stated pocket 8, the lid wall 16 and, if required, pocket side walls, which are not shown. Bottom and lid parts 6 and 7 are pivotably connected to one another by hinge means 17.

The driver teeth 19 of the carriers or hubs 20 shown in part in FIG. 2 are visible in the drive openings 18 of the cassette K. Locking elements 9 and 10, which in FIG. 3 consist of a ring segment 21, a longitudinal web 22 and a central peg 23, project into these drive openings 18, the ring segments 21, viewed from the transverse central axis q of the cassette, being arranged on the outside and roughly symmetrically with respect to the longitudinal central axis 1. In most of the examples, the length of the ring segments 21 is an arc corresponding to an angle of about 30°. However, any length may be chosen, including, for example, a 180° arc, as in the example in FIG. 4e. As shown in the perspective view in FIG. 3, the lock element 9 or 10 is integral with the ring segment 21, the web 22 and, preferably, the peg 23 on the bottom wall 12 of the container 5. To be precise, the web 22 is in two parts relative to the peg 23 and, viewed from the free end of the peg 23, is bevelled downward, on at least one side the length of the web part 22 being so great that said part engages between the driver teeth 19 of the hub 20 to lock the hub 20 and prevent unwinding, of the wound tape. The height and shape of the ring segment 21 is chosen so that engagement of the drive opening 18 of the cassette K is possible but not of the driver orifice of the hub 20. The distance c from the radially outermost web part 22 to the outer circumference of the ring segment 21 should be slightly smaller than the diameter d of the drive opening 18, all cassette tolerances being taken into account. The partial distance a should advantageously be smaller than the partial distance b (cf. FIG. 2).

The height of the peg 23 should be roughly adapted to the internal dimension W of the container 5 in order to increase the stability of the container 5 to compression. The overlap 24 of the edge contour parts of the front wall of the pocket 8 and of the cut-out 11 of the bottom part also serve this purpose. Another advantage of this overlap is improved protection from dust.

FIG. 3 shows a one-part embodiment of the locking element 9, 10. The parts 21-23 can of course also be produced in such a way that they are a distance apart. For one-piece production, it is advantageous to position the flat ejector according to arrow f on the end face of the peg 23.

FIGS. 4a-4e show variants of the locking elements arranged and formed according to the invention.

Figure 4A:
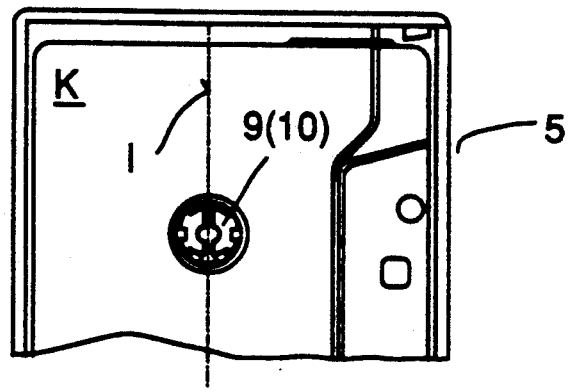
Figure 4C:
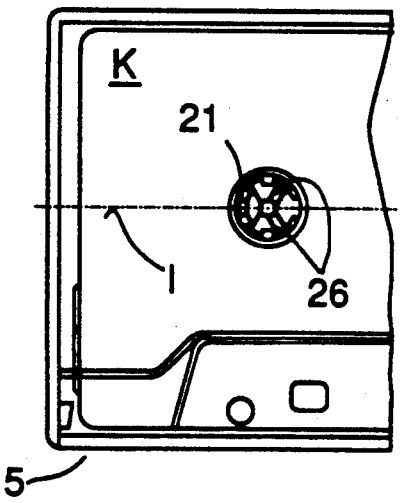
Figure 4B:
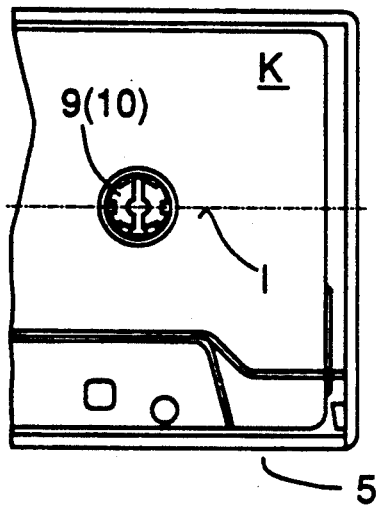

FIG. 4a shows the locking element 9, 10 in a position rotated 180° with respect to FIG. 1. In 4b, the locking element 9, 10 is rotated through 90°, so that the web 22 is at right angles to the longitudinal central axis 1. 4c shows an embodiment having two angled webs 26 and the ring segment 21, each of which is symmetrical with respect to the longitudinal central axis 1.

Figure 4D:
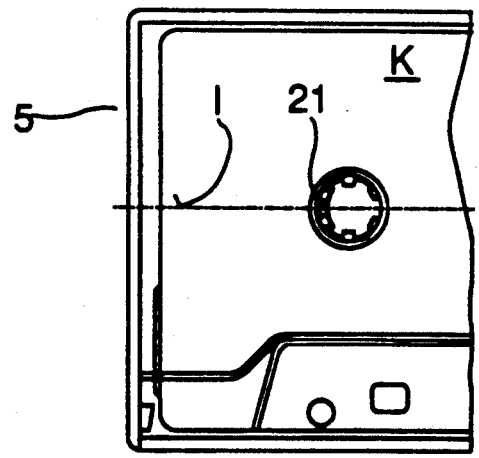
Figure 4E:
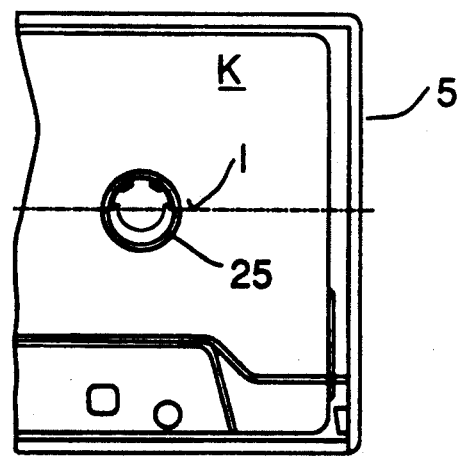

FIG. 4d shows the symmetrical ring segment 21 without any webs or pegs, which thus serves merely for locking the cassette housing and is once again on the outside, symmetrical with respect to the longitudinal axis 1. Finally, FIG. 4e shows a 180° arc segment which is provided symmetrically to a normal to the longitudinal axis 1 and is thus capable of preventing longitudinal and transverse movements of the cassette K in the container 5.

The individual variants can be used individually or in pairs, depending on whether the cassettes are one-reel or double-reel cassettes. However, combinations of two different variants in one and the same container are also possible and can be advantageously used for protecting the cassette.

The invention described is advantageous in practice since, compared with conventional cassette containers, the damage to the cassettes during falling, transport or unintentional compression can be greatly reduced in the novel container and said container can be produced by a more advantageous process and provides better protection from dust.

We claim:

1. In a parallelepiped container for a tape cassette, which tape cassette contains a longitudinal central axis, at least one hub for carrying tapes, which hub has a drive orifice, a housing containing the at least one hub for carrying tapes, and at least one drive opening having a circular shape in the housing through which the hub for carrying tape is engagable by driver means; the container comprising I) a bottom part comprising a bottom wall with at least one locking element for the at least one hub for carrying tapes in the tape cassette, at lest one back wall or front wall, and a side wall; and II) a lid part comprising one lid wall; the improvement comprising: the at least one locking element on the bottom wall contains 1) a ring segment extending less than 360° between its two ends and having an upper surface which is parallel to the bottom wall, which ring segment has an exterior arc shape which substantially corresponds in size to the circular shape of the drive opening of the cassette housing for contact between the ring segment of the locking element and the cassette housing, and 2) at least one web which is of such height as to extend into the driver orifice of the hub for carrying tapes when the cassette is in place in the container and when said ring segment is in the drive opening.

2. The container as claimed in claim 1, wherein the ring segment is of such height that the ring segment extends to the tape carrier hub, but not into the driver orifice when the cassette is in place in the container.

3. The container as claimed in claim 1, wherein the at least one ring segment and the at least one web are arranged substantially symmetrically with respect to the longitudinal central axis of the cassette.

4. The container as claimed in claim 1, wherein the at least one ring segment and the at least one web are arranged substantially symmetrically to a normal to the longitudinal central axis of the cassette.

5. The container as claimed in claim 1, wherein the at least one ring segment has the length of an arc corresponding to an angle in the range of about 30° to about 80°.

6. The container as claimed in claim 1, wherein the at least one web has an outermost part extending from the ring segment, which outermost part has a distance from the outer circumference of the ring segment which is slightly smaller than the diameter of the drive opening of the cassette housing when the cassette is in place in the container.

7. The container as claimed in claim 1, wherein the locking element contains a peg whose height substantially corresponds to the internal height dimension of the closed container.

8. The container as claimed in claim 1, wherein the locking element contains the ring segment and the web as integral parts.

9. The container as claimed in claim 8, wherein the peg is an integral part of the locking element.

10. In a container for a compact tape cassette, which tape cassette contains a longitudinal central axis, two hubs for carrying tapes, each hub having a driver orifice, a housing containing the two hubs for carrying tapes and two drive openings having circular shapes in the housing through which the hubs for carrying tape are engagable by driver means; the container comprising I) a bottom part comprising a bottom wall and two locking elements for the two hubs in the cassette and at least one back wall or front wall and a side wall, and II) a lid pat comprising one lid wall; wherein the bottom wall has a cut-out and the lid part has a receiving pocket for the compact cassette and a pocket front wall complementing the cut-out of the bottom wall, the improvement comprising: each of the two locking elements on the bottom wall of the container contains a ring segment extending less than 360° between its two ends and having an upper surface which is parallel to the bottom wall, which ring segment has an exterior arc shape which substantially corresponds in size to the circular shape of each of the drive openings of the cassette housing for substantial contact between each ring segment and the cassette hosing, and each of the two locking elements contains at least one web which is of such height as to extend into the driver orifice of the hub for carrying tapes when the cassette is in place in the container and when the ring segment is in one of the drive openings.

11. The container as claimed in claim 10, wherein the ring segment is of such height that the ring segment extends to the tape carrier hub, but not into the driver orifice when the cassette is in place in the container.

12. The container as claimed in claim 10, wherein the ring segment and the webs are arranged substantially symmetrically with respect to the longitudinal central axis of the cassette.

13. The container as claimed in claim 10, wherein the ring segments and the webs are arranged substantially symmetrically to a normal to the longitudinal central axis of the cassette.

14. The container as claimed in claim 10, wherein each of the ring segments has the length of an arc corresponding to an angle in the range of about 30° to about 180°.

15. The container as claimed in claim 10, wherein each of the webs has an outermost part extending from the ring segment which has a distance from the outer circumference of the ring segment which is slightly smaller than the diameter of the drive opening of the cassette housing when the cassette is in place in the container.

16. The container as claimed in claim 10, wherein the locking element contains a peg whose height substantially corresponds to the internal height dimension of the closed container.

17. The container as claimed in claim 10, wherein the locking element contains the ring segment and the web as integral parts.

18. The container as claimed in claim 17, wherein the peg is an integral part of the locking element.

* * * * *